United States Patent [19]

Kumada

[11] Patent Number: 4,642,509
[45] Date of Patent: Feb. 10, 1987

[54] ULTRASONIC MOTOR USING BENDING, LONGITUDINAL AND TORSIONAL VIBRATIONS

[75] Inventor: Akio Kumada, Kokubunji, Japan

[73] Assignee: Hitachi Maxell, Ltd., Osaka, Japan

[21] Appl. No.: 831,578

[22] Filed: Feb. 21, 1986

[30] Foreign Application Priority Data

Apr. 19, 1985 [JP] Japan ............................ 60-82668
Sep. 9, 1985 [JP] Japan ............................ 60-197750
Sep. 9, 1985 [JP] Japan ............................ 60-197751

[51] Int. Cl.⁴ ............................................. H01L 41/08
[52] U.S. Cl. ............................... 310/323; 310/328; 310/333
[58] Field of Search ............... 310/322, 323, 325, 328, 310/333

[56] References Cited

U.S. PATENT DOCUMENTS

| 4,210,837 | 7/1980 | Vasiliev et al. | 310/323 |
| 4,325,264 | 4/1982 | Sashida | 310/323 X |
| 4,562,374 | 12/1985 | Sashida | 310/323 X |

FOREIGN PATENT DOCUMENTS

| 0576648 | 10/1977 | U.S.S.R. | 310/323 |
| 0604058 | 4/1978 | U.S.S.R. | 310/323 |
| 0642804 | 1/1979 | U.S.S.R. | 310/323 |
| 0803048 | 2/1981 | U.S.S.R. | 310/323 |

Primary Examiner—Mark O. Budd
Attorney, Agent, or Firm—Birch, Stewart, Kolasch & Birch

[57] ABSTRACT

An ultrasonic motor having a cantilever type longitudinal/torsional vibration coupling element with a beam and a rotor rotated by the vibration of the beam. The rotor is provided with contacting surface for only contacting the beam in the outer peripheral portion of the surface of the beam away from the torsional vibration axis of the beam.

10 Claims, 14 Drawing Figures

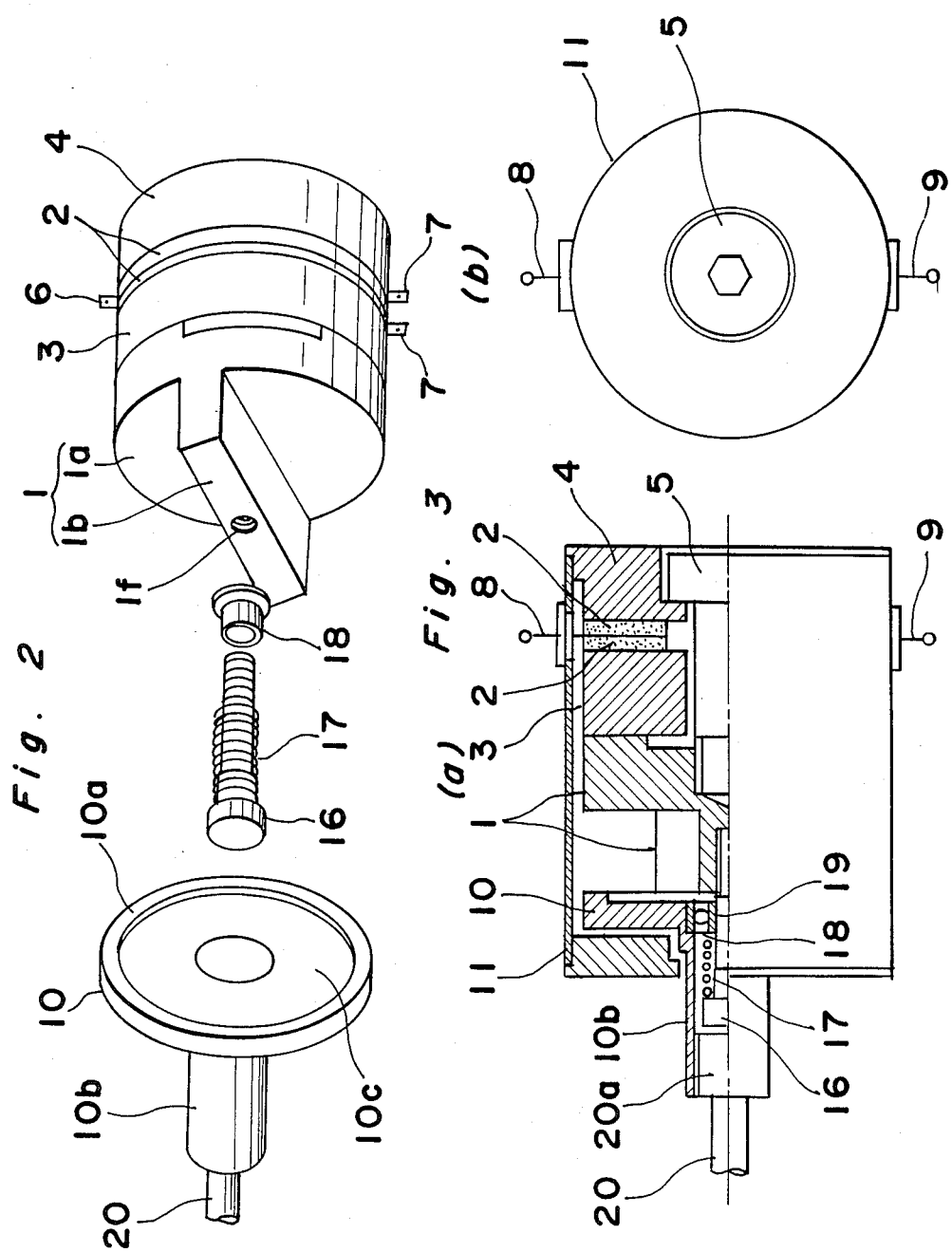

Fig. 4
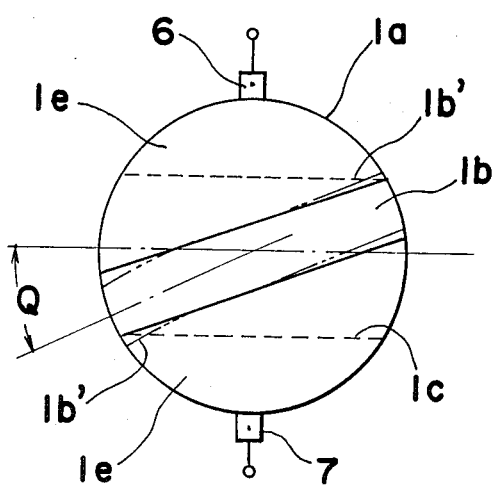
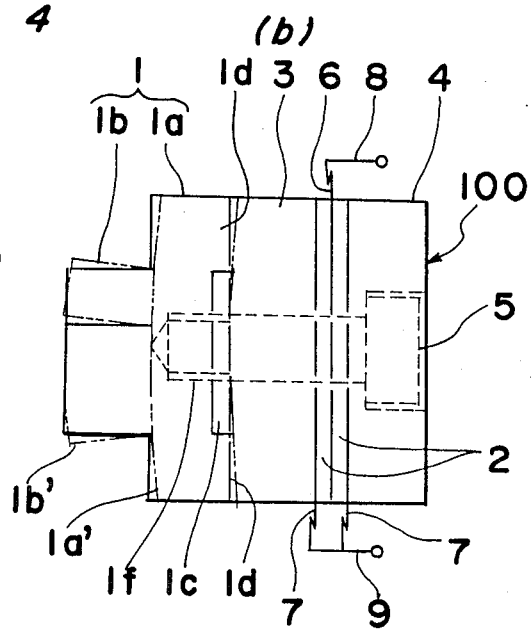
Fig. 5
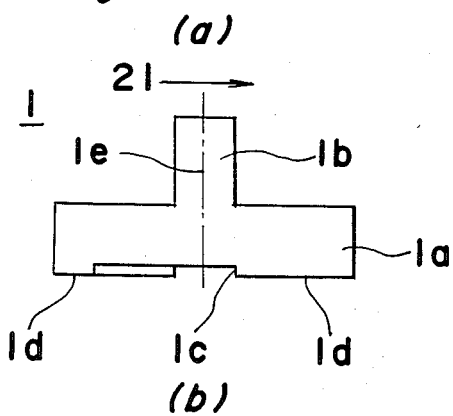
Fig. 6
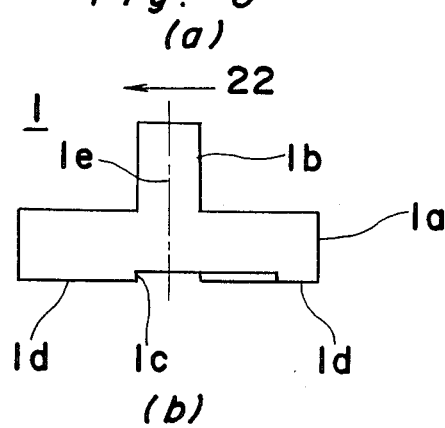
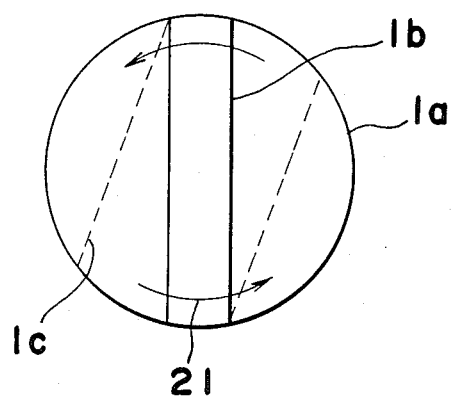
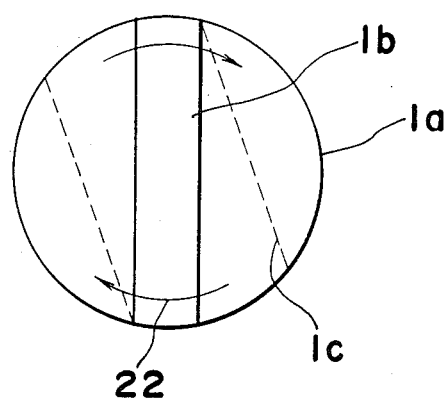

ULTRASONIC MOTOR USING BENDING, LONGITUDINAL AND TORSIONAL VIBRATIONS

BACKGROUND OF THE INVENTION

1. Field of the Invention

The present invention relates to an ultrasonic motor comprising a stator including a bending vibration plate, a longitudinal and torsional vibration coupling element having a beam extending slated relative to the vibration axis of the bending vibration plate, a piezoelectric thickness vibration element connected with the longitudinal and torsional vibration coupling element through an elastic vibration element, a longitudinal vibration element combined with the longitudinal and torsional vibration coupling element, the elastic vibration element and the piezoelectric thickness vibration element, said beam of the stator generating elliptical vibration which is combination of longitudinal vibration generated in the piezoelectric thickness vibration elements and then boosted in the elastic vibration element and torsional vibration generated in the longitudinal and torsional vibration coupling element excited by the longitudinal vibration and therefore having the same frequency of the vertical vibration, and a rotor which is contacted with the leg of the stator to receive the elliptical vibration to be rotated.

2. Description of the Prior Art

The conventional ultrasonic motor is comprised of a vertical vibration element such as a bolt fasten vibrator which has been used in the ultrasonic industry. However in order to rotate a rotor, the vertical vibration has to be transformed into a rotational torque and therefore, many problems occur. In order to generate the rotational torque, ultrasonic elliptical vibration should be used. However, there has not been available an ultrasonic vibration element which can directly generate elliptical vibrations. Thus, it can not be expected to manufacture ultrasonic motor using ultrasonic elliptical vibration element. Piezoelectric motors using the elliptical vibration of the traveling elastic wave have a problem that the input and output efficiency is low.

As a result of a study attempting to solve the problems mentioned above, an ultrasonic motor having a stator using the ultrasonic elliptical vibration element in a cantilever manner was developed, but the motor has not shown sufficient desirable results.

The ultrasonic vibration element in the cantilever manner thus developed is shown in FIG. 8(a), in which a rotational torque can be obtained on a rotor pressed onto a free surface of the beam 1b by generation of the elliptical vibration 31 having one diameter in a direction perpendicular to the free surface of the beam 1b. The elliptical vibration can be generated by combining a tosional vibration 25 based on a bending vibration 26 of the bending vibration plate 1a integrally formed with the beam 1b and a vertical vibration having the same frequency of a vibration driving the bending vibration plate 1a. The bending vibration of the bending vibration plate 1a is transformed into the torsion 26 because the longitudinal direction of the bending vibration plate 1a is slanted relative to the center line X—X of the bending vibration as shown in FIG. 8b. In order to generate the elliptical vibration on the free end surface of a cantilever element, it is essential to arrange the beam 1b against the center line X—X of the bending vibration of the bending vibration plate 1a. However, when such a construction is adopted, the direction of the torsion acting on the beam 1b can not be perpendicular to the longitudinal direction of the beam 1b, whereby there occurs a component displaced from the direction perpendicular to the longitudinal direction.

In the ultrasonic motor using the vibration element mentioned above as the stator to which a rotor is rotatably depressed, the vectors of the rotational torque are shown at 28 and 28' in FIG. 8b. As understood, there occur vector components 29 and 29' in a radius direction of the rotor other than the vector components 27 and 27' of the tangent of the circumference of the rotor. The torque of the radius direction causes the depressing surface of the stator to rub the rotor surface in the radius direction. Apparently this rubbing motion does not contribute to an increase in the rotational torque of the rotor but wears off the surfaces of the stator and the rotor. In order to provide the torsional vibration of the rotor, it is necessary to make the beam slanted relative to the center line of the bending vibration, however such a slanted beam causes a force in the radial direction.

SUMMARY OF THE INVENTION

An essential object of the present invention is to provide an improved ulrasonic motor which is able to eliminate such drawbacks inherent in the prior art mentioned above. In particular, it is an object of the instant invention to provide depressed surfaces of the stator and rotor of the ultrasonic motor using the vibration element of the cantilever type which are easiy worn due to displacement between the direction of the torque of the motor and tangent of the periphery of the rotor in order to increase the life of the motor.

According to the present invention, in the ultrasonic motor of the cantilever type, in order to decrease the area of the slidable surface of the stator having the displacement component in the radial direction, the end surface of the beam is adapted to be separable from the rotor surface in the inner area near the central axis of the vibration of the torsional movement of the stator. This end surface is also adapted to be depressed by the outer peripheral portion of the rotor.

The output being obtainable in the inner area near the vibration center axis by the depression with the rotor is relatively low. However, the outer surface where the displacement components slide is relatively large and wearing tends to occur here. The stator and rotor can act effectively to produce a high output, whereby the wearing due to displaced components becomes relatively small.

It is another object of the present invention to obtain an ultrasonic motor of a high output with a samll amount of wearing of the stator by depressing the beam of the stator with the rotor in the outer area.

According to the present invention, there is provided an ultrasonic motor comprising a stator including a bending vibration plate, a longitudinal and torsional vibration coupling element having a beam extending slanted relative to the vibration axis of the bending vibration plate, a piezoelectric thickness vibration element connected with the longitudinal and torsional vibration coupling element through an elastic vibration element, a longitudinal vibration element combined with the longitudinal and torsional vibration coupling element, the elastic vibration element and the piezoelectric thickness vibration element, said beam of the stator generating elliptical vibration which is combination of longitudinal vibration generated in the piezoelectric thickness vibration elements and then boosted in the elastic vibration element and torsional vibration generated in the longitudinal and torsional vibration coupling element excited by the longitudinal vibration and therefore having the same frequency of the vertical vibration, and a rotor which is contacted with the leg of the stator to receive the elliptical vibration to be rotated, wherein the improvement comprises surface contacting means for contacting with the beam of the stator only in the outer peripheral portion of the surface of the beam away from the torsional vibration axis and depressing means for applying a force to depress the contact surface means to said beam.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a partial exploded perspective view of the motor shown in FIG. 1, FIG. 3a is a front view of the embodiment of the ultrasonic motor according to the present invention with a top half portion in cross sectioned.

FIG. 3b is a side view of the ultrasonic motor shown in FIG. 3a,

FIG. 4a is a side view showing an operation of the stator of the ultrasonic motor shown in FIG. 1, FIG. 4b is a front view showing an operation of the stator of the ultrasonic motor shown in FIG. 1, FIG. 5a is a front view of a longitudinal/torsional vibration coupling element used in the embodiment of FIG. 1, FIG. 5b is a side view of FIG. 5a, FIG. 6a is a front view of a longitudinal/torsional vibration coupling element used in the embodiment shown in FIG. 1, FIG. 6b is a side view of the element shown in FIG. 6b.

DETAILED DESCRIPTION OF THE PREFERRED EMBODIMENT

Example 1

Figure 1:
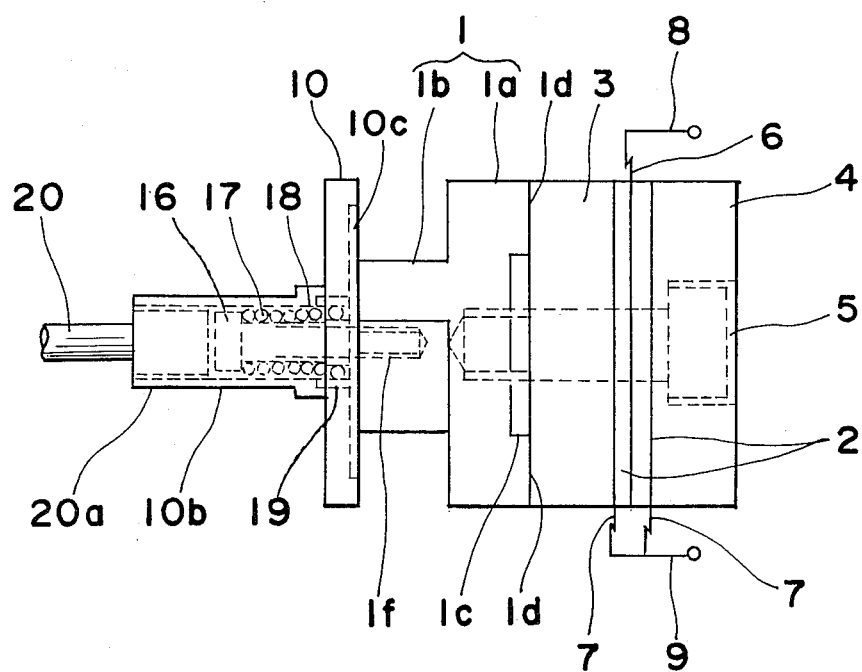
FIG. 1 is a front view of a preferred embodiment of an ultrasonic motor according to the present invention.

Referring to FIG. 1 to FIG. 6, reference numeral 1 is a ultrasonic longitudinal/torsional vibration coupling element (referred to as L/T vibration coupling element or L/T coupler) of the cantilever type made of aluminum. Reference numeral 2 is a pair of piezoelectric thickness vibration elements having an annular ring shape and being made of Pb (Zr or Ti) $O_3$ of 35 mm outer diameter, 15 mm inner diameter and 2 mm thickness. Reference numerals 3 and 4 are respectively aluminum discs of 35 mm outer diameter, 8.2 mm inner diameter and 10 mm thickness. Reference numeral 5 is a bolt, 6 and 7 are terminal plates made of copper, 8 and 9 are lead wires, 10 is a steel rotor, 11 is a motor case, 16 is a bolt, 17 is a coil spring, 18 is a collar, 19 is a bearing, and 20 is a shaft having a connecting portion 20a screwed and inserted into the cylindrical part 10b of the rotor 10. The longitudinal vibration means the vibration in a cylindrical axis of the coupling element 1 and the torsional vibration means the vibration in the directions shown in the arrow marks 21 or 22 in FIGS. 5 and 6.

First of all, explanation is made about the cantilever type L/T coupling element 1 which acts to generate the rotation torque of the ultrasonic motor.

Referring to FIG. 4, the L/T vibration coupling element 1 is made of a metallic block having a disc 1a of outer diameter 35 mm and 9 mm height and a beam 1b of square shape projected from one of the surface of the disc 1a with 7 mm thickness, 35 mm width and 10 mm length. As shown in the drawings, the beam 1b extends across the diameter of the disc 1a and passes through the center of the disc 1a. The other surface of the disc 1a has a slot 1c extending across its diameter and a pair of projections 1d on both peripheral edge portions of the disc 1a. Each of the projections 1d have a flat surface 1e which serves as a member for supporting the cantilever type L/T vibration coupling element 1. The beam 1b is offset relative to the slot 1c by an angle Q of 26°. The piezoelectric thickness vibration elements 2 are put between the aluminum discs 3 and 4 which act as the elastic vibrating members of low ultrasonic loss. The screw 5 is penetrated through the piezoelectric thickness vibration elements 2 and aluminum discs 3 and 4 and is screwed by a torque wrench (not shown) of 150 kg f cm into the threaded hole 1f defined at the central portion of the disc 1a. The respective elements 1, 2, 3, and 4 are thus clamped with one of the surfaces of the aluminum disc 3 in contact with the flat surface of the projections 1d to form a resonator 100. In this arrangement shown in FIG. 4, when the ultrasonic vibration driven element 2 is excited by application of a high frequency voltage to the terminal plates 6 and 7, the vibration occurring at the element 2 is boosted by the aluminum discs 3 and 4 to generate a large amplitude vibration. Thus, the disc 1a can be bent to a position 1a' by the force of the vibration of the piezoelectric thickness vibration elements 2. The square plate 1b is then deformed as shown at 1b' with one end of the plate 1b secured at the disc 1a and other end to be moved as a free end so that a torsional vibration occurs in the plate 1b, thus resulting in the torsional and elliptical vibration which is a combination of the longitudinal vibration mode and torsional vibration mode. In this case the longitudinal vibration requires a large amplitude sufficient to bend the disc 1a of the L/T vibration coupling element 1. Therefore, an elastic vibration element made of an elastic material of low ultra sonic loss such as aluminum must be interposed for boosting the vibration produced in the piezoelectric thickness vibration elements 2 between the disc 1a of the L/T vibration coupling element 1 and the piezoelectric thickness vibration elements 2. In the preferred embodiment, the elastic vibration elements 3 and 4 are disposed above and below the piezoelectric thickness vibration elements 2, thereby obtaining a large vertical vibration.

When a rotor is depressed onto the free end of the beam 1b which vibrates with the torsional elliptical vibration mode, the rotor can be rotated by the torque transferred from the beam. Thus, a rotational motor can be obtained.

In order to depress the rotor 10 onto the L/T vibration coupling element 1, the bolt 16 is inserted through the coil spring 17, the collar 18 and the bearing 19 and the end portion of the bolt 16 is screwed into the screw hole 1f. The rotor 10 is depressed onto the free end of the L/T vibration coupling element 1 by about 10 kgf/cm$^2$ force of the spring 17 compressed between the screw head of the bolt 16 and the collar 18. The outer race of the bearing 19 is strictly fitted in the receiving hole of the rotor 10 and the bolt 16 is slidably passed through the inner race of the bearing 19. Thus, the rotor 10 can be rotatably supported on the bolt 16 by the bearing 19 applying the resilient force of the spring 17 to the rotor 10.

The motor 10 has an annular member 10a projecting in the direction of a cylindrical axis of the rotor 10 toward the beam 1b with a flat end surface for contacting the end surface of the beam 1b which is oscillated in the torsional eliptical vibration, thereby producing rotational torque on the rotor 10.

Looking at the vibration mode at the end surface of the L/T vibration coupling element 1, the end surface of the L/T vibration coupling element 1 can be repeatedly projected or retracted making the screw hole 1f the center of vibration. When the end surface of the beam 1b is projected, the spring is compressed and the depressing force of the beam 1b to the annular member 10a of the rotor is at a maximum. When the end surface of the beam 1b is retracted, the depressing force of the beam 1b to the annular member 10a is at a minimum. The end surface of the beam 1b is projected when the piezoelectric thickness vibration element 2 is shrunk and is retracted when the piezoelectric thickness vibration element 2 is expanded. Therefore, when the depressing force of the beam 1b to the rotor 10 is at a maximum, the beam 1b is retracted and when the depressing force of the beam 1b to the rotor 10 is at a minimum, the beam 1b is projected, whereby, from the view point of the phase, the timing when the rotor 10 receive the maximum torque and the timing when the depressing force is maximum is in phase and the rotor 10 rotates in the directions of arrow marks 21 in FIG. 5 and 22 in FIG. 6.

The rotor 10 is provided with the annular member 10a of 2.5 mm width at the outer peripheral edge portion of the rotor 10 for being depressed by the beam 1b. Thus, a round recess 10c is formed in the annular member 10a of a 1 mm depth. Accordingly, when the rotor 10 is mounted on the L/T vibration coupling element 1, the rotor 10 depresses the flat surface of the beam 1b. A strong rotational torque can be transferred to the rotor 10 decreasing the entire amount of the contact area with the beam 1b, thereby suppressing the friction between the rotor 10 and the beam 1b. The effect mentioned above can be obtained when the inner diameter of the annular member 10a is made greater than about one half of the length of the beam 1b, preferably in the range of 4/7 to 6/7 of the length of the beam 1b. When the depressing means for depressing the rotor 10 is located at the central portion of the beam 1b, the rotational torque can coincide with the phase at which the maximum torque occurs. The effective impedance of the motor can then be decreased and this arrangement is suitable for providing a high efficiency piezoelectric motor with a great torque and low input voltage. However, the present invention is not limited to the arrangement described above, for example, as shown in FIG. 7, it may be possible to dispose the spring 15 between the bottom of the motor case 11 and the bottom of the aluminum disc 4. The depressing force for depressing the rotor 10 onto the free end of the beam 1b is generated by the coil spring 15 which is compressed by a pressure control screw 14. The motor case 11 thus acts as the fulcrum. Reference numerals 12 and 13 show the output shaft of the motor 10 and the bearing.

Figure 7:
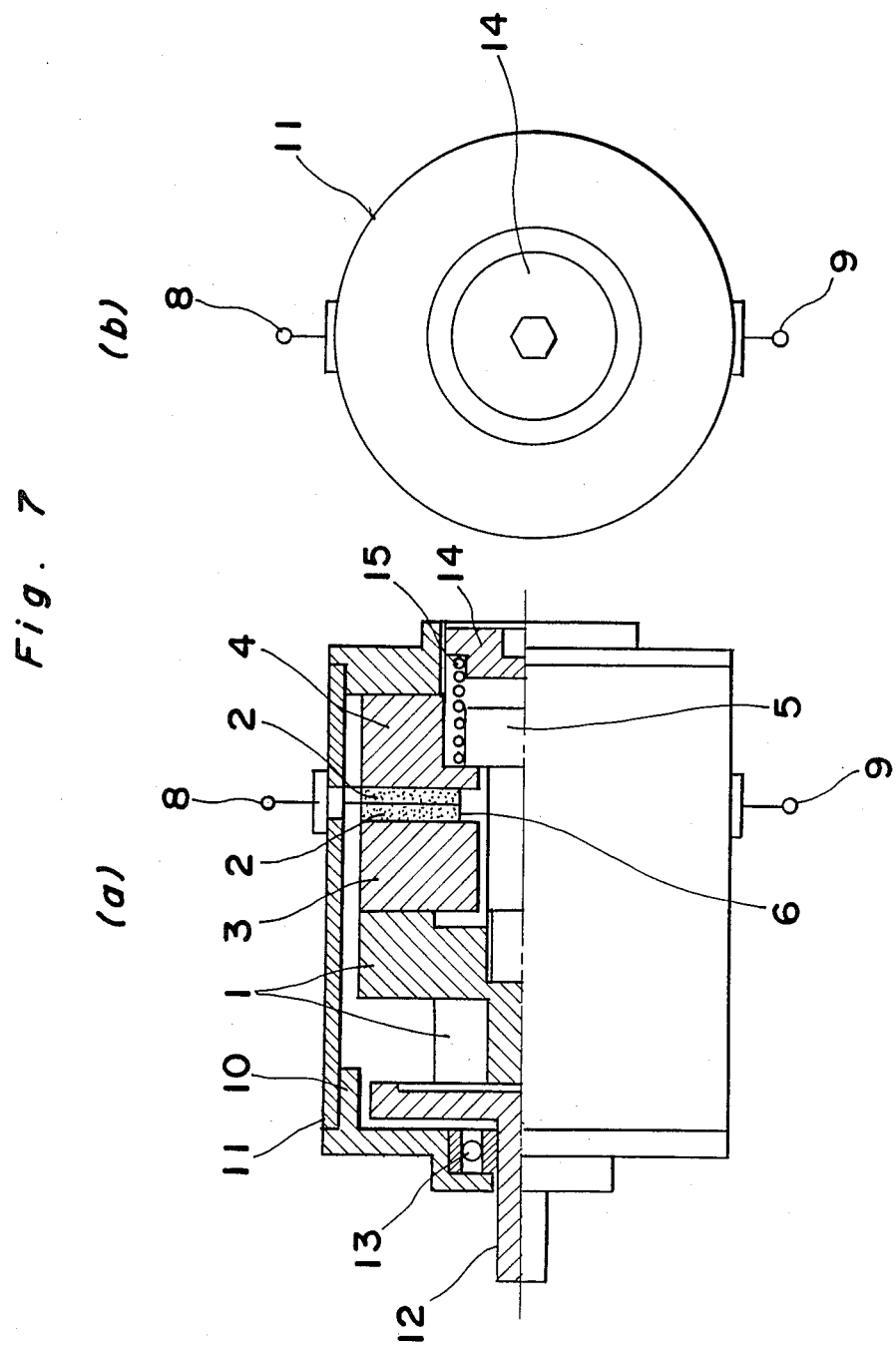
FIG. 7a is a front view of the ultrasonic motor.
FIG. 7b is a side view of the motor shown in FIG. 7b.
Figure 8:
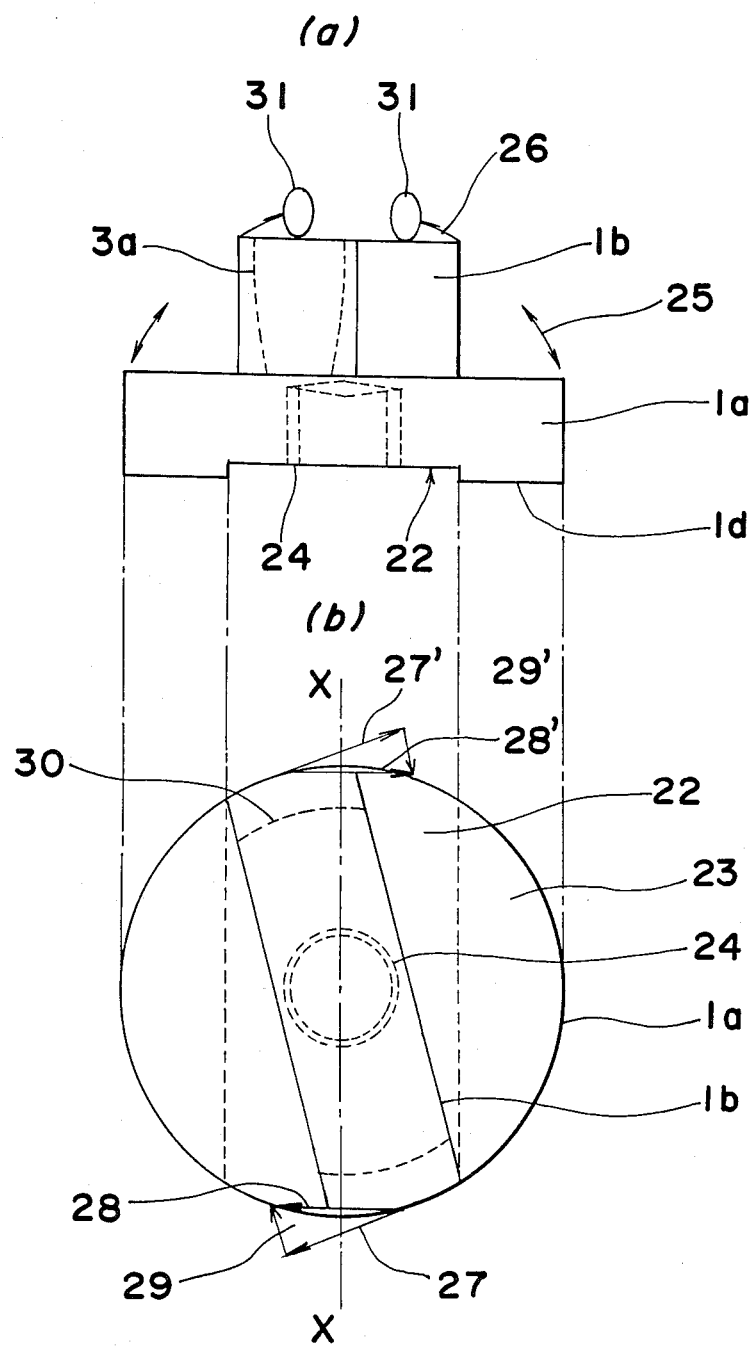
FIG. 8a is a front view of an ultrasonic longitudinal/-torsional vibration coupling element with the operation thereof depicted.
FIG. 8b is a side view of the element shown in FIG. 8a, FIG. 9 is a cross sectional view showing a second embodiment of the ultrasonic motor according to the present invention.

In the motor shown in FIG. 7, it is necessary to use the piezoelectric thickness vibration elements for rotating the motor. For this purpose, it is necessary to apply a high frequency voltage higher than 20 KHz to the piezoelectric thickness vibration elements 2. By selecting the frequency of the applying voltage, the motor can be rotated in the clockwise direction or counter clockwise direction.

Normally, 20 KHz to 50 KHz frequency is used. The revolution speed of the motor can be changed by selecting the voltage of the high frequency power source. For example, in the motor using the stator having 35 mm outer diameter and 45 mm height and the rotor of 35 mm outer diameter and 5 mm thickness, the motor begins to rotate in the counterclockwise direction upon application of 10 volt sine wave voltage of 40.85 KHz to the piezoelectric thickness vibration elements 2. The motor will rotate 60 to 100 r.p.m. upon application of 30 volt sine wave, 100 to 150 r.p.m. for 50 volt, 150 to 250 r.p.m. for 70 volt, 200 r.p.m. for 100 volt and 400 r.p.m. for 100 volt. When the frequency of the applied voltage is changed, the rotation speed is lowered and the rotor is reversed at 39.64 KHz with a high torque. The rotation of the rotor is the same as both directions.

In the embodiment mentioned above, the beam 1b is formed by an elongated rectangular plate, and the rotor surface which contacts the beam 1b is made by the annular ring member. It is within the scope of the invention to make these portions in various other shapes.

Various modifications of the beam 1b and the contacting surface 10a of the rotor are described in FIGS. 8 to 11.

Example 2

In the modifications the basic arrangement of the L/T vibration coupling element 1 is the same used in the embodiment described above. The difference between the modifications and this embodiment is that a concave portion 1e is defined in the center portion of the beam 1b of the L/T vibration coupling element 1 and the beam 1b is divided into two parts.

Figure 9:
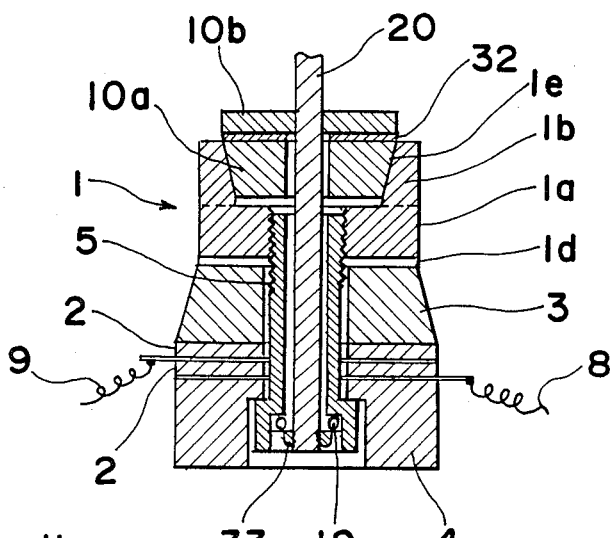

The piezoelectric elliptical vibration elements of the L/T vibration coupling element 1 is used as a stator and the rotor having a conical roller is depressed thereto, the motor shown in FIG. 9 can be formed. A conical roller 10a which contacts the concave portion 1e is covered with an elastic sheet 32. An output shaft 20 is inserted in the disc 10b and is passed through the roller 10a to form the rotor. The output shaft 20 of the rotor is penetrated through a center hole of a cap bolt 5 then fastened by a nut 33 engaged with the ball bearing 19. The conical roller 10a is then pressedly securely to the stator. The conical roller 10a is made of wear resistance materials such as hardened copper. Upon application of a sine wave voltage of 36 KHz to the piezoelectric thickness vibration elements 2 through the lead wires 8 and 9, the arcuate shape leg 1d disposed on both sides of the slot 1c can be vibrated due to the vertical vibration occurred in the piezoelectric thickness vibration elements 2. The bending vibration element 1a supported by the cap bolt 5 at the center thereof is vibrated in a folded manner. As a result of the vibration, a torsional vibration occurs on the beam 1b disposed slanted against the slot 1c and a strong torque occurs on the conical roller 10a secured onto the divided surface of the beam 1b and the output shaft 20 was rotated about 80 r.p.m.

The rotation in the motor is smooth since the conical roller 10a is used compared to the conventional ultrasonic motor using a disc roller which is depressed to the stator end surface.

The elastic sheet 32 can serve to absorb the vibration applied to the conical roller 10a and to transfer the driving force occurring in the conical roller 10a to the output shaft 10 through the disc 10b. The elastic sheet 32 is made of a silicon rubber sheet having a suitable friction coefficient.

Example 3

Figure 10:
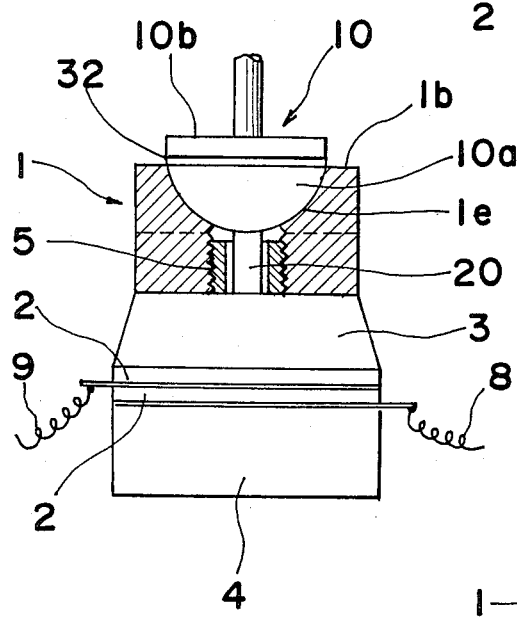
FIG. 10 is a partial cross sectional view of a third embodiment of the ulrasonic motor according to the present invention.

Referring to FIG. 10, a third example of the ultrasonic motor according to the present invention is shown, in which the like parts are shown by the like number shown in the various embodiments shown in FIGS. 1 to 9.

The L/T vibration coupling element 1 has its beam 1b defining a concave 1e of a semispherical shape and the beam 1b contacts a roller 10a of a semispherical shape complimentary to the concave 1e. The radius of the semispherical shape of the concave 1e of the beam 1b is slightly greater than the radius of the roller 10a. Therefore, since the contact between the sliding surfaces of the roller 10a and the surface of the concave 1e is limited to the maximum diameter portion of the roller 10b, the frictional engagement of the roller 10a with the concave 1e can be prevented even if the depression force of the roller 10a to the concave 1e is made large and the amplitude of the vibration is made large.

Example 4

Figure 11:
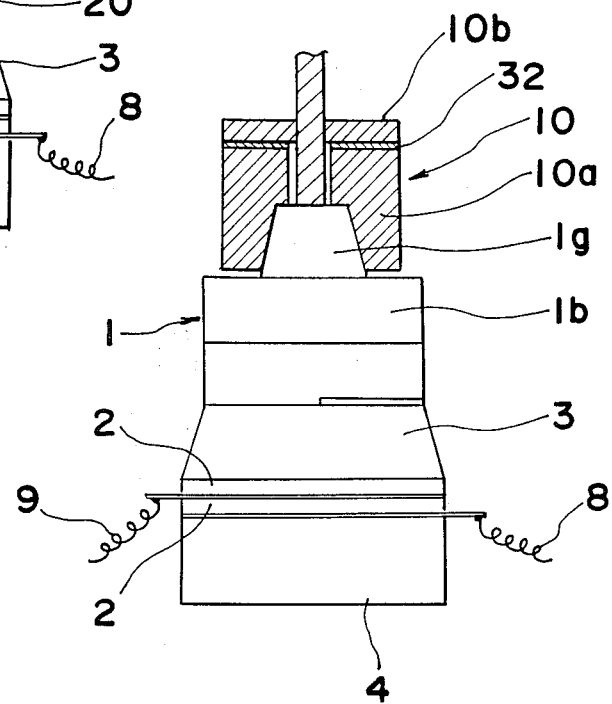
FIG. 11 is a partial cross sectional view of a fourth embodiment of the ultrasonic motor according to the present invention.

Referring to FIG. 11, showing the fourth example of the ultrasonic motor according to the present invention, in which the beam 1b of the L/T vibration coupling element 1 has a projected member 1g of a frustoconical shape. Both end surfaces of which are cut perpendicular to the cone axis. The roller 10a has a generally cylindrical shape with the bottom half thereof recessed in a frustoconical shape to receive the projected member 1g. The roller 10a is thus detachably fitted and in contact with the projected member 1g. In the example shown in FIG. 11, the vibration component which does not contribute to the rotation of the roller 10a in the torsional vibration acting onto the beam 1b of the L/T vibration coupling element 1 acts as the depressing force between the stator and rotor. Wear of both member can be decreased.

Example 5

In the ulrasonic motor of the Example 1, the ultrasonic vibration is transferred to the output shaft 20 but is attenuated some amount. To solve this problem, the motor may be formed as shown in FIG. 12.

Figure 12:
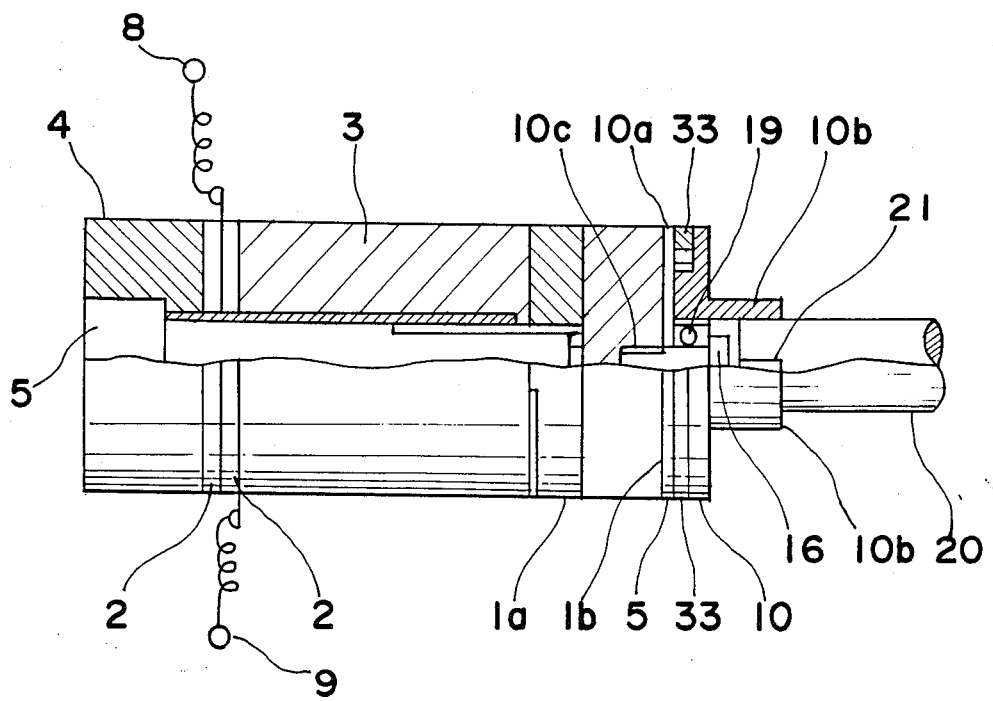
FIG. 12 is a partial cross sectional view of a fifth embodiment of the ulrasonic motor according to the present invention.

Referring to FIG. 12, the rotor 10 may be divided into a sliding ring 10a and rotation shaft 10b. An elastic ring 33 is inserted between the sliding ring 10a and the rotation shaft 10b. The fastening force of the bolt 16 which is slidably fitted in the rotation shaft 10b is transferred to the sliding ring 10a. The ultrasonic vibration of the sliding ring 10a is absorbed by the elastic ring 33. By this arrangement, the elastic ring 33 transfers the force form the sliding ring 10a to the load and the depressing force is transferred to the sliding surface 10a absorbing the ultrasonic vibration.

Example 6

Figure 13:
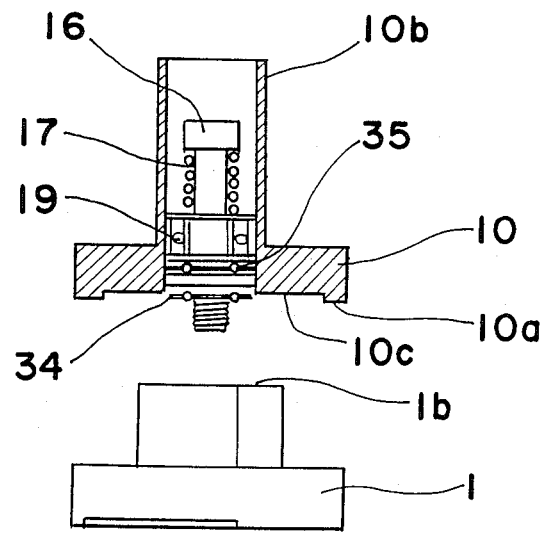
FIG. 13 is a cross sectional view of a rotor used in a sixth embodiment of the ultrasonic motor according to the present invention.

Referring to FIG. 13, the problem of the rotor receiving the vertical vibration from the stator, and then the vertical vibration being counteracted by the depression force and the rotor then contacting the stator end surface at the reversed phase of the the stator elliptical motion is overcome. When the bearing is diposed between the rotor and the stator end, the rotor is strongly vibrated when the stator is in the reversed phase. This vibration can be prevented by a thrust bearing, preventing the rotor from contacting the stator so that wearing due to depression of the rotor against the stator surface at the time of the reversed phase can be decreased.

Namely in the example 6, as shown in FIG. 13, a thrust bearing 34 is received in the central portion of the rotor 10b. A bolt to which a coil spring 17 is mounted is fastened to the end surface 1b of the L/T vibration coupling element 1 through the bearing 19. This bearing 19 and thrust bearing 35 prevents the neck portion of the rotor 10b from being misaligned. The sliding surface 10a of the rotor 10 is depressed onto the end surface of the beam 1b of the L/T vibration coupling element 1. In the ultrasonic motor as arranged in the manner mentioned above, undesired contact can be prevented by the thrust bearing 34, and occurrence of the frictional noise between the rotor and stator at the time of reversed phase of the elliptical vibration can be prevented. Thus, wear of the rotor and the stator is prevented.

The ultasonic motor mentioned in the various examples can be applied to cutting machines and grinding machine.

Example 7

Figure 14:
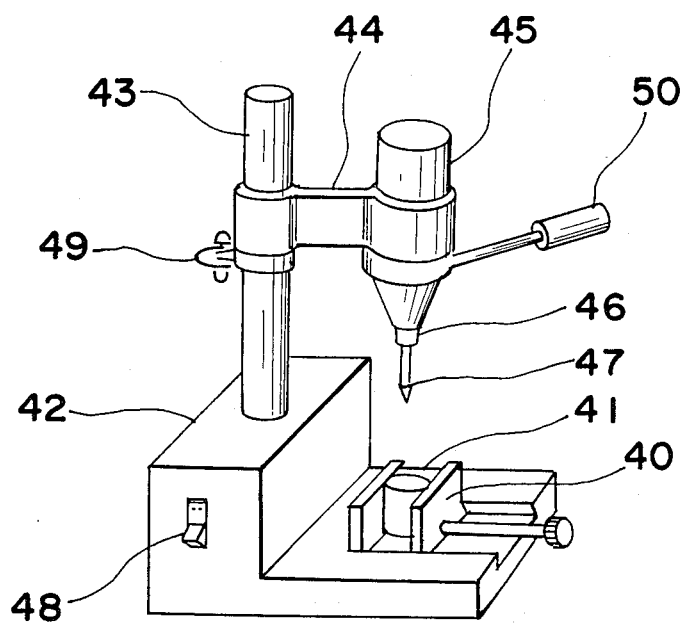
FIG. 14 is a perspective view showing a drilling machine in which the ultrasonic motor is used.

Referring to FIG. 14, a drilling machine using the ultrasonic motor is shown in which a workpiece 41 fixed on a dies mechanism 40 is to be drilled. A standard 43 vertically standing on a base 42 is provided for vertically adjusting the position of the ultrasonic motor is by arm 44. A collet chuck 46 is mounted on the output shaft of the ultrasonic motor 45 for mounting a grinder 47 or drill needle as a grinding tool or drilling tool. When a power switch 48 is turned on, a high frequency power supply accommodated in the standard is excited and the output shaft of the ultrasonic motor rotates 600 r.p.m. Accordingly, the grinder 47 is rotated. By releasing a faster 49, the ulrasonic motor is moved in the downward direction upon pressing a lever 50 downward. The grinder 47 approaches the workpiece 41. Seeing that the tip of the grinder 47 comes to the punch hole, the operator pushed down the lever 50 and the grinder 47 contacts the workpiece to start grinding.

As is characteristic of the ultrasonic motor, when the load becomes heavy, the rotation speed of the motor is lowered, so that the lever 50 must be strongly pressed downwardly during grinding. Toward completion of grinding, the lever is pushed downwardly with a decreased force. In the case where the work is metal and a deep hole is to be made the grinder may be exchanged for the drill. A desired hole can then be cut by the machine shown in FIG. 14 in the same manner as a drilling machine. The advantages of the machine are in that the working speed is rapid and super hard material such as super steel and ceramics can easily be cut.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An ultrasonic motor comprising a stator including a bending vibration plate, a longitudinal and torsional vibration coupling element having a beam extending slanted relative to the vibration axis of the bending vibration plate, a piezoelectric thickness vibration element connected with the longitudinal and torsional vibration coupling element through an elastic vibration element, a longitudinal vibration element combined with the longitudinal and torsional vibration coupling element, the elastic vibration element and the piezoelectric thickness vibration element, said beam of the stator generating elliptical vibration which is combination of longitudinal vibration generated in the piezoelectric thickness vibration elements and then boosted in the elastic vibration element and torsional vibration generated in the longitudinal and torsional vibration coupling element excited by the longitudinal vibration and therefore having the same frequency of the vertical vibration, and a rotor which is contacted with the leg of the stator to receive the elliptical vibration to be rotated, wherein the improvement comprises surface contacting means for contacting with the beam of the stator only in the outer peripheral portion of the surface of the beam away from the torsional vibration axis and depressing means for applying a force to depress the contact surface means to said beam.

2. The motor according to claim 1, wherein said surface contacting means is made of a disc having an annular ring contactable with the beam.

3. The motor according to claim 1, wherein said depressing means have a fulcrum near the center of the beam.

4. The motor according to claim 1, wherein said beam comprises means for holding the rotor so that a part of the vibration component which does not contribute to rotate the rotor works onto the peripheral portion of the rotor as the depressing force.

5. The motor according to claim 4, wherein said holding means is a recess for receiving a rotor having a frustoconical shape.

6. The motor according to claim 4 , wherein said holding means is a recess for receiving a rotor having a semispherical shape.

7. The motor according to claim 4, wherein said holding means is a projection formed in the central portion of the beam in the form of frustoconical shape.

8. The motor according to claim 2, wherein said motor further comprises means for separating the vibration system from the output system so that the vertical component of the ultrasonic elliptical vibration of the stator is not transferred to the output system through the rotor.

9. The motor according to claim 8, said separating means is an elastic material of a large ultrasonic loss mounted on the depressing means.

10. The motor according to claim 1, wherein the direction of rotation of the motor can be changed by changing the frequency of the power applied to the piezoelectric thickness vibration elements.

* * * * *